US009031287B2

(12) United States Patent
Ma

(10) Patent No.: US 9,031,287 B2
(45) Date of Patent: May 12, 2015

(54) SYSTEM AND METHOD FOR ESTIMATING AGES OF FORESTS FROM REMOTELY SENSED IMAGES

(71) Applicant: Weyerhaeuser NR Company, Federal Way, WA (US)

(72) Inventor: Zhenkui Ma, Kent, WA (US)

(73) Assignee: Weyerhaeuser NR Company, Federal Way, WA (US)

( * ) Notice: Subject to any disclaimer, the term of this patent is extended or adjusted under 35 U.S.C. 154(b) by 139 days.

(21) Appl. No.: 13/729,514

(22) Filed: Dec. 28, 2012

(65) Prior Publication Data

US 2014/0185884 A1 Jul. 3, 2014

(51) Int. Cl.
*G06K 9/00* (2006.01)

(52) U.S. Cl.
CPC .................................. *G06K 9/00657* (2013.01)

(58) Field of Classification Search
USPC .......................................................... 382/110
See application file for complete search history.

(56) References Cited

U.S. PATENT DOCUMENTS

| | | | | |
|---|---|---|---|---|
| 8,208,689 | B2 * | 6/2012 | Savolainen et al. | 382/110 |
| 8,306,941 | B2 * | 11/2012 | Ma | 706/62 |
| 8,655,070 | B1 * | 2/2014 | Yang et al. | 382/173 |
| 2011/0135196 | A1 | 6/2011 | Paris et al. | |

OTHER PUBLICATIONS

Kasischke, E., et al., "Locating and Estimating the Areal Extent of Wildfires in Alaskan Boreal Forests Using Multiple-Season AVHRR NDVI Composite Data," Remote Sens. Environ. 51:263-275 (1995).
Saders, S., et al., "Tropical Forest Biomass and Successional Age Class Relationships to a Vegetation Index derived from Land sat TM Data"; Remote Sens. Environ. 28:143-156 (1989).

* cited by examiner

*Primary Examiner* — Shefali Goradia
(74) *Attorney, Agent, or Firm* — Perkins Coie LLP

(57) ABSTRACT

A programmed computer system estimates the age of trees from a number of remotely sensed images of an area of interest. Vegetation Index (V.I.) values are determined for pixel locations in the number of images. The V.I. values are analyzed to find a V.I. value that correlates with a known age of a tree. Once the date of the image that produced the V.I. value is known, the current age of the trees that correspond to the pixel location is determined.

6 Claims, 3 Drawing Sheets

SYSTEM AND METHOD FOR ESTIMATING AGES OF FORESTS FROM REMOTELY SENSED IMAGES

FIELD OF THE TECHNOLOGY

The technology disclosed herein relates to forest management techniques, and in particular to techniques for estimating the ages of forests in remotely sensed images.

BACKGROUND

In forest management, it is often desirable to be able to estimate the ages of trees within an area of interest. Such information can be used to determine when it is time to harvest the trees in the area or to perform other tasks such as thinning, applying fertilizer as well as for estimating value of the timber on the land, etc.

One conventional method of estimating the ages of trees in an area of interest is to cruise a portion of the area and make sample age measurements. From these measured samples, the ages of the trees in the entire area of interest can be statistically determined. As the sizes of managed forests, increase however, it is becoming cost prohibitive to cruise a sufficient number of sample areas in the forest to make accurate age predictions. Given this problem, many land holders are beginning to rely on remote sensing methods to analyze their forest lands.

While remotely sensed images of forest lands contain significant amounts of information regarding the land being imaged, there is a need for improved methods of accurately estimating the ages of the trees shown in those images.

SUMMARY

As will be discussed in further detail below, the technology described herein relates to a system and method for estimating the ages of trees shown in a number of dated, remotely sensed images. In one embodiment, a vegetation index (V.I.) is calculated at pixel locations in a number of the dated, remotely sensed images. A composite image is created that stores the V.I. values determined for a particular pixel location. The V.I. values are than analyzed for a V.I. value that correlates with the V.I. value associated with a known age of a tree. The date of the remotely sensed image associated with the V.I. value located is used to estimate the age of the trees in the area represented by the pixel.

In one embodiment, a non-transitory computer readable media includes instructions that are executable by the programmed processor to estimate the ages of trees in a number of dated, remotely sensed images. V.I. values are computed for pixels in the images and the V.I. values are analyzed for s value that correlates with a V.I. value associated with trees of a known age. In one embodiment, a drop in a V.I. value that is lower than a threshold value indicates newly planted trees. The date of the image associated with the drop in the V.I. value is used to estimate the current age of the trees in the area represented by the pixel in the images.

DETAILED DESCRIPTION OF THE PREFERRED EMBODIMENTS

Figure 1:
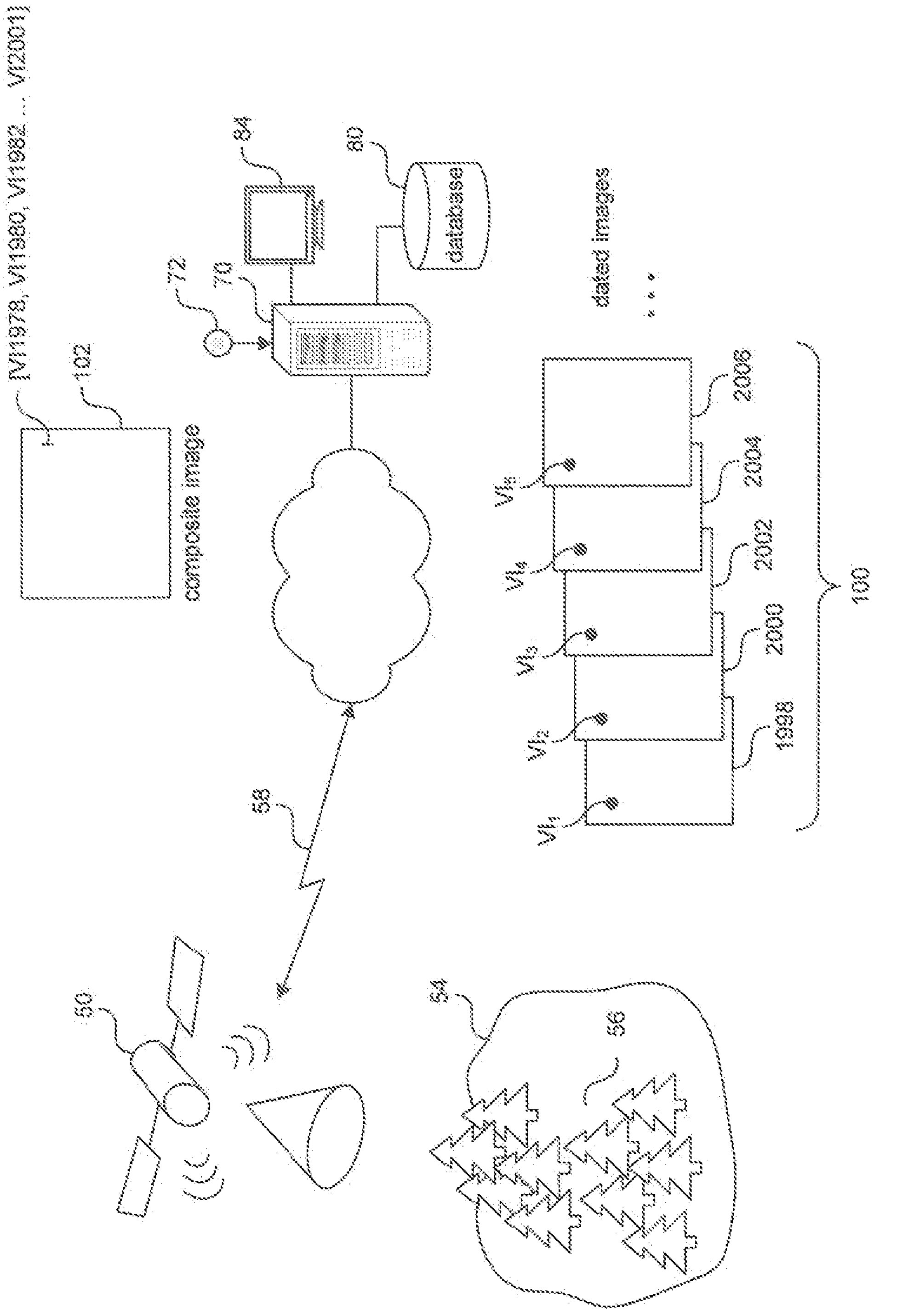
FIG. 1 illustrates a system for estimating the ages of trees from a number of dated, remotely sensed images of an area of interest in accordance with one embodiment of the disclosed technology.

FIG. 1 illustrates a computer-based system for estimating the ages of trees in an area of interest from a number of remotely sensed images. In the embodiment shown, a satellite 50 or other remote sensing system, obtains images from an area of interest 54. The area of interest 54 includes vegetation 56 such as trees or other crops for which knowing their age is useful. The satellite system 50 produces images using light that is detected in a number of spectral bands. For example, the Landsat imaging system managed by the United States Geologic Survey (USGS) produces images using light that is detected in numerous spectral bands including a near infrared band having wavelengths in the range of 770-900 micrometers and a red reflectance band having wavelengths between 630-690 micrometer.

As will be appreciated by those of ordinary skill in the art of forest management and remote sensing, a vegetation index (V.I.) value for a location in an image can be computed based on the ratio of the near infrared spectral reflectance data to the red spectral band reflectance data. Other formulas for computing the V.I. index from the near infrared and red reflectance spectral data are also known.

In the embodiment shown, images produced by the remote sensing system 50 (e.g. satellite system) are transmitted via a wired or wireless computer communication link 58 (such as the internet) to a computer system 70. The computer system 70 includes a memory and one or more processors that are configured to execute program instructions stored on a non-transitory computer readable media 72 such as a CD-ROM, hard drive, flash drive or the like. In one embodiment, the computer system 70 is programmed to recall a number of remotely sensed Images for the same area of interest 54 from a database 80 or other computer readable memory. Each of the remotely sensed images has a date on which the image data was obtained.

After standardizing each image in accordance with data provided by the supplier of the remotely sensed images, the computer system determines the V.I. values for the same pixel location in each of a number of the remotely sensed images. The various V.I. values are then analyzed to determine how the values vary over time.

In the example shown in FIG. 1, five images 100 of the same area of interest are shown. Each of the images 100 was obtained in a different year with the first image obtained in 1998 and the last image obtained in 2006. Once the images are standardized and the V.I. values calculated, a composite image 102 is created that contains or stores each of the different V.I. values computed for a particular pixel location.

Figure 2:
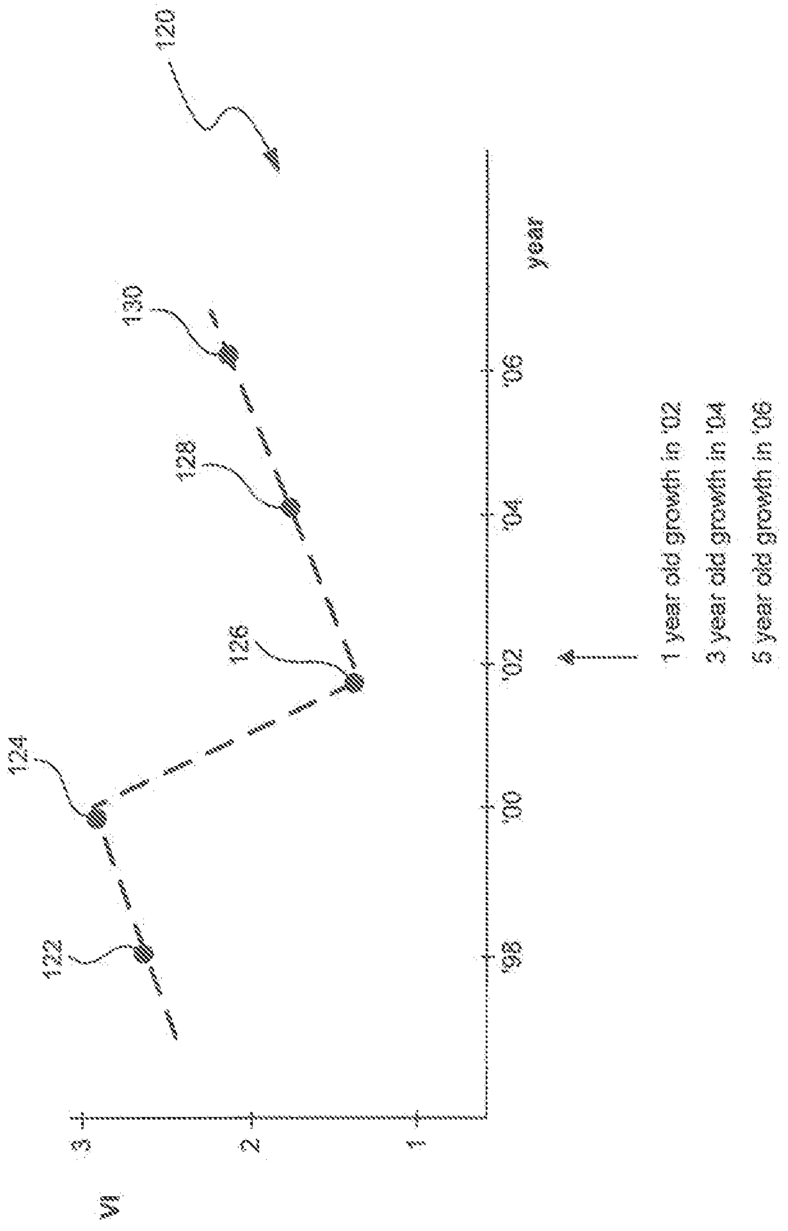
FIG. 2 illustrates a plot of computed vegetation index (V.I.) values determined from a number of dated, remotely sensed images.

As shown in FIG. 2, the V.I. values for a particular pixel location can vary over time. With most vegetation such as trees, the V.I. values steadily increase with each year of a tree's growth. For example, in loblolly pine that is grown in the southern United States, it was determined that V.I. values of 1.0-1.7 correlate to trees in the first year of growth. V.I. values between 1.7-2.0 were found to correlate to trees in their second year of growth and V.I. values greater than 2.0 were found to correlate lo trees in their third year of growth. A stand of trees that is imaged right after thinning may have V.I. values of about 2.5 and a mature stand will have V.I. values that are greater than 2.5 for any given year. The particular correlation between the computed V.I. values and the year of growth may vary depending on the type of tree or vegetation in the area of interest or may vary depending on other factors such as the geographic location, soil conditions, average rainfall in the region of interest etc. In general, ground truth age data and corresponding remotely images may be analyzed to correlate particular computed V.I. values to the ages of the trees that are shown in the images. V.I. values less than 1.0 usually represent non-forest areas and can be coded as such in the images.

To estimate the ages of trees in an area of interest, the V.I. values at a pixel location are computed in successive images. The V.I. values are searched to determine if a V.I. value matches or is within the range of V.I. values known to correspond to a particular age of tree. In the example shown in FIG. 2, the V.I. value 122 calculated from a 1998 remotely sensed image is approximately 2.5. The V.I. value 124 that is computed for the same location in an image taken in the year 2000 is approximately 3.0. However, in 2002, a V.I. value computed for the pixel location in the remotely sensed image drops to approximately 1.3 and then increases to approximately 1.5 in the remotely sensed image that was obtained in 2004. Therefore, by searching the string or an array of V.I. values, it can be determined that the trees at a location corresponding to the pixel in the remotely sensed images were one year old in 2002. Because it is known that the trees were one year old in 2002, it is easily calculated that the trees are three years old in 2004 and five years old in 2006, etc.

Although images from only eight years are shown in FIG. 1, it will be appreciated that images for an area of interest should be obtained over 20 years or more in order to have a distribution of V.I. values or a growth curve over time from which the age of the trees can be determined. If V.I. values computed for a pixel location increase in each of the images, it can be determined that the trees have an age that is at least greater than or equal to the difference in years between the date of the first image analyzed and the date of the last image analyzed. For example, if images are obtained between 1980 and 2010 and the V.I. values calculated from those images steadily increase (or at least do not significantly decline), it can be determined that the age of the trees at corresponding locations in the images are at least 30 years old.

Once the ages of the frees are determined, maps of the ages of the trees can be displayed on a computer monitor, printed on a printer or transmitted to a remote location for analysis. Additionally, reports can be generated based on the age of the trees determined. From the ages determined, forest management decisions can fee made such as thinning, fertilizing, harvesting etc.

Figure 3:
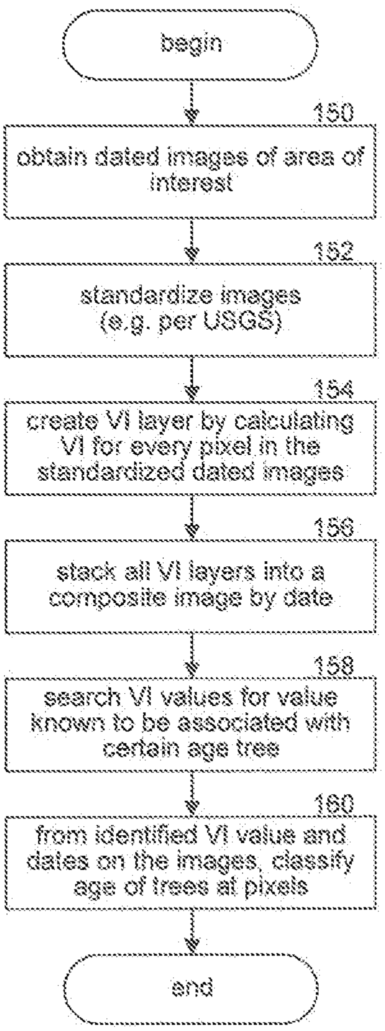
FIG. 3 illustrates a flow diagram of steps performed by a programmed computer system in accordance with one embodiment of the disclosed technology.

FIG. 3 illustrates a series of steps performed by a programmed computer system to analyze a number of remotely sensed images in order to estimate the ages of vegetation shown in those images in accordance with one embodiment of the disclosed technology. Although the steps are described in an order for ease of explanation, it will be appreciated that the steps could be performed in a different order or different steps performed while still achieving the described functionality.

Beginning at 150, a programmed computer system obtains a number of dated, remotely sensed images for an area of interest. At 152, the computer system standardizes the images using data provided from the supplier of the remotely sensed images. For example, the USGS provides standardization information with its Landsat images to compensate for variations in the images due to changes in seasons and other effects.

At 154, the computer system creates a V.I. layer for each image by computing the V.I. values for all the pixels in the standardized, dated, remotely sensed image.

At 156, the computer system stacks the V.I. layers into a composite image that can be used for display, query, classification and examination. A representative composite image 102 is illustrated in FIG. 1. The composite image includes each of the V.I. layers that were computed from each of the dated images. In the example shown, the layers of the composite image 102 include values [V.I.-1978, V.I.-1980, V.I.-1982 . . . V.I.-2008] for 30 years of V.I. data at each pixel location.

At 158, the series of V.I. values for a pixel location that were computed from the number of remotely sensed images is searched for a V.I. value known to correlate with a particular age of tree. If a V.I. value is located that correlates to a particular age of tree, then the current age of the trees at that pixel location can be calculated based in the difference in time between the date of the image from which the V.I. value that correlated to the known age of a tree was found and the current date.

At 158, the computer system classifies the ages of the trees represented at every pixel location in the composite image in order to identify the ages of trees in the area of interest as well as identifies non-forest land in the images. Once the ages of the trees have been classified, reports, maps, displays etc. can be produced showing the ages of the trees. For example, trees in the composite image with an age less than 5 years can be shown in red, while those with ages between 10-15 years can be shown in green and mature trees can be shown in blue. The reports, maps, displays etc, can be viewed on a display screen, printed, transmitted to a remote location or otherwise stored in memory for future analysis. A false color image of the composite image can be displayed be selecting V.I. data from 3 different years as the red, blue and green color components of a pixel in the displayed false color image.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium also can be, or can be included in, one or more separate physical components or media (e.g., multiple CDs, disks, or other storage devices). The operations described in this specification can be implemented as operations performed by a data processing apparatus on data stored on one or more computer-readable storage devices or received from other sources.

The term "programmed processor" encompasses all kinds of apparatus, devices, and machines for processing data, including by way of example a computer, a system on a chip, or multiple ones, or combinations, of the foregoing. The apparatus can include special purpose logic circuitry, e.g., an FPGA (field programmable gate array) or an ASIC (application-specific integrated circuit). The apparatus also can include, in addition to hardware,, code that creates an execution environment for the computer program in question, e.g., code that constitutes processor firmware, a protocol slack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need net have such devices. Moreover, a computer can be embedded In another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media end memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display), LED (light emitting diode), or OLED (organic light emitting diode) monitor, for displaying information to the user and a keyboard and a pointing device, e.g., a mouse or a trackball, by which the user can provide input to the computer. In some implementations, a touch screen can be used to display Information and to receive input from a user. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a users client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include any number of clients and servers. A client and server are generally remote from each other and typically interact through a communication network. The relationship of client and server arises by virtue of computer programs running on the respective computers and having a client-server relationship to each other.

From the foregoing, it will be appreciated that specific embodiments of the invention have been described herein for purposes of Illustration, but that various modifications may fee made without deviating from the spirit and scope of the invention. For example, in some cases V.I. values may be computed and searched for only a portion of a remotely sensed image. In other embodiments, a computer system may receive remotely sensed images that have already been standardized and Include V.I. data for the pixel locations. The computer can therefore just build a composite image and search the composite image for V.I. values that correspond to a known age of tree. Accordingly, the invention is not limited except as by the appended claims.

I claim:

1. A method of operating a computer system to estimate the ages of trees shown in remotely sensed images, comprising:

receiving a number of dated, remotely sensed images of an area of interest that include vegetation index (V.I.) values computed for a number of pixels;

creating a composite image that stores the V.I. values computed for the pixel locations;

analyzing the V.I. values stored in the composite image for the pixel locations for a V.I. value that correlates with a known age of a tree; and estimating the ages of the trees that correspond to the pixel locations based on the date of the remotely sensed image from which the V.I. value that correlates with the known age of a free was computed.

2. The method of claim 1, further comprising:

identifying pixel locations in the composite image having a V.I. value less than a threshold value as being non-vegetation areas.

3. The method of claim 1, wherein the computer system analyzes the V.I. values by:

searching the V.I. values stored for a pixel in the composite image for a V.I. value that corresponds to a V.I. value associated with a free in a first year of growth.

4. A computer system configured to estimate the ages of trees shown in a remotely sensed image, comprising:

a memory for storing a number of program instructions;

a processor configured to execute the instructions, in order to:

receive a number of dated, remotely sensed images of an area of interest that have spectral data from which a vegetation Index (V.I.) can be computed;

standardize the number of dated, remotely sensed images;

compute vegetation index (V.I.) values for the same pixel location in the number of dated, remotely sensed images;

create a composite Image that stores the V.I. values computed from the number of dated, remotely sensed images for each pixel location;

analyze the V.I. values in the composite image for a value that correlates with a known age of a tree; and estimate the ages of the trees corresponding to a pixel location based on the date of the Image from which the V.I. value that correlates with the known age of a free was computed.

5. A non-transitory computer readable media, including instructions that are executable by a programmed processor to perform a method of estimating the ages of trees shown in a remotely sensed image by:

receiving a number of dated, remotely sensed images of an area of interest that include computed vegetation index (V.I.) values for pixels in the images;

creating a composite image that stores the V.I. values computed from the number of dated, remotely sensed images;

analyzing the V.I. values for a pixel in the composite image for a value that correlates with a known age of a tree; and estimating the ages of the trees that correspond to a pixel location based on the date of the image from which the V.I. value that correlates with the known age of a tree was computed.

6. A computer system configured to estimate the ages of trees shown in a remotely sensed image, comprising:

a memory for storing a number of program instructions;

a processor configured to execute the instructions, in order to:

receive a number of dated, remotely sensed images of an area of interest for which vegetation index (V.I.) values have been computed at a number of pixel locations;

create a composite image that stores the V.I. values computed from the number of dated, remotely sensed images;

analyze the V.I. values for a pixel in the composite image for a value that correlates with a known age of a tree; and estimate the ages of the trees corresponding to the pixel location based on the date of the image from which the V.I. value that correlates with the known age of a tree was computed.

* * * * *